(12) United States Patent
Nam (10) Patent No.: US 7,408,443 B2
(45) Date of Patent: Aug. 5, 2008

(54) CIRCUIT AND METHOD FOR REDUCING FIXED PATTERN NOISE

(75) Inventor: Jung-hyun Nam, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 634 days.

(21) Appl. No.: 10/340,745

(22) Filed: Jan. 13, 2003

(65) Prior Publication Data

US 2004/0135910 A1    Jul. 15, 2004

(51) Int. Cl.
*H04N 9/083* (2006.01)
*H04N 5/335* (2006.01)

(52) U.S. Cl. .................................... 340/308; 348/283

(58) Field of Classification Search ................. 348/272, 348/273, 280, 283, 300, 320
See application file for complete search history.

(56) References Cited

U.S. PATENT DOCUMENTS

| | | | |
|---|---|---|---|
| 6,661,457 B1 * | 12/2003 | Mathur et al. | 348/273 |
| 6,838,651 B1 * | 1/2005 | Mann | 250/208.1 |
| 6,885,396 B1 * | 4/2005 | Panicacci et al. | 348/241 |
| 2003/0043089 A1 * | 3/2003 | Hanson et al. | 345/55 |

* cited by examiner

*Primary Examiner*—Lin Ye
*Assistant Examiner*—Dillon Durnford Geszvai
(74) *Attorney, Agent, or Firm*—Harness, Dickey & Pierce (57) ABSTRACT

An image sensor and method, which includes a switching device for establishing a connection between at least one column line and one of at least two analog-to-digital converter blocks, where at least one of the at least two analog-to-digital converter blocks is connectable to at least two rows of a plurality of unit pixels. An image sensor and method, where, if a row line is odd, column outputs from odd column lines of an active pixel sensor array are connected to a first correlated double sampling block and column outputs from even column lines of the active pixel sensor array are connected to a second correlated double sampling block and if the row line is even, column outputs from odd column lines of the active pixel sensor array are connected to the second correlated double sampling block and column outputs from even column lines of the active pixel sensor array are connected to the first correlated double sampling block. An image sensor and method where a first subset of a plurality of unit pixels are connected to a first correlated double sampling block and a second subset of the plurality of unit pixels are connected to a second correlated double sampling block, where the first subset of the plurality of unit pixels are blue and red pixels and the second subset of the plurality of unit pixels are green pixels. A circuit and method for reducing fixed pattern noise.

58 Claims, 11 Drawing Sheets

Bayer Color Filter Array example) Pixel (M+1, N+1)
r={R(M,N)+R(M+2,N)+R(M,N+2)+R(M+2,N+2)}/4
g={G$_R$(M+1,N)+G$_B$(M,N+1)+G$_B$(M+2,N+1)+G$_R$(M+1,N+2)}/4
b=B(M+1,N+1)

|   | M | M+1 | M+2 | M+3 |
|---|---|---|---|---|
| N | R | $G_R$ | R | $G_R$ |
| N+1 | $G_B$ | B | $G_B$ | B |
| N+2 | R | $G_R$ | R | $G_R$ |
| N+3 | $G_B$ | B | $G_B$ | B |

⇧ Demosaic

|   | M | M+1 | M+2 | M+3 |
|---|---|---|---|---|
| N | r,g,b | r,g,b | r,g,b | r,g,b |
| N+1 | r,g,b | r,g,b | r,g,b | r,g,b |
| N+2 | r,g,b | r,g,b | r,g,b | r,g,b |
| N+3 | r,g,b | r,g,b | r,g,b | r,g,b | example) Visual Image Pixel (M+1, N+2)
r={R(M,N+2)+R(M+2,N+2)}/2
g= $G_R$(M+1,N+2)
b={B(M+1,N+1)+B(M+1,N+3)}/2 example) Visual Image Pixel (M+2, N+1)
r={R(M+2,N)+R(M+2,N+2)}/2
g= $G_B$(M+2,N+1)
b={B(M+1,N+1)+B(M+3,N+1)}/2

|   | M | M+1 | M+2 | M+3 |
|---|---|---|---|---|
| N | r,g,b | r,g,b | r,g,b | r,g,b |
| N+1 | r,g,b | r,g,b | r,g,b | r,g,b |
| N+2 | r,g,b | r,g,b | r,g,b | r,g,b |
| N+3 | r,g,b | r,g,b | r,g,b | r,g,b |

Fig.11 Pixel Signal Readout Process of a frame

Fig. 12

CIRCUIT AND METHOD FOR REDUCING FIXED PATTERN NOISE

BACKGROUND OF THE INVENTION

1. Field of the Invention

The present invention generally relates to a circuit and method for reducing fixed pattern noise. In particular, the present invention relates to a circuit and method for reducing fixed pattern noise in a CMOS image sensor.

2. Description of the Related Art

Figure 1:
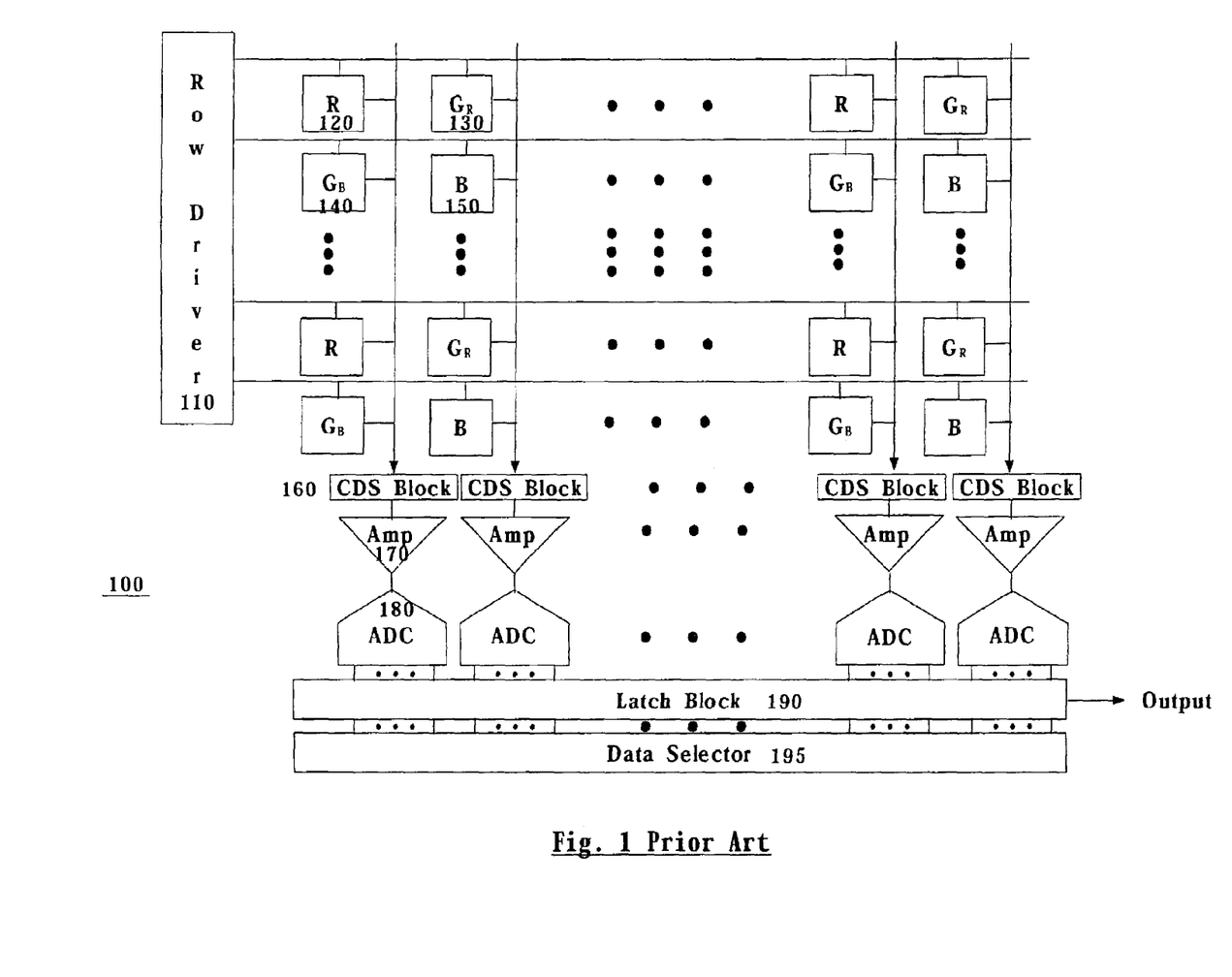
FIG. 1 illustrates a conventional CMOS image sensor.

FIG. 1 illustrates a conventional CMOS image sensor 100 using a Bayer-type color filter array as shown in U.S. Pat. No. 3,971,065. A color pixel array using the Bayer type color filter array has three types of pixels, red 120, blue 150 and green 130, 140. $G_R$ 130 is a green pixel located in the same row as a red pixel 120, and $G_B$ 140 is a green pixel located in same row as a blue pixel 150.

Each color image signal from each pixel 120, 130, 140, 150 is converted to a digital signal by an analog to digital converter (ADC) 180. An ADC 180 is connected to each column of pixels. Each column has one ADC 180.

Image signals from a single row (each row includes pixels from plural columns) is selected by a row driver 110, held and sampled by a correlated double sampling block (CDS) 160, amplified by an amplifier 170 and converted to digital signals by the ADC 180 of each column. The digital signals from the ADC 180 are latched in a latch block 190 and outputted in series by a data selector 195, in accordance with a selection signal.

As illustrated in FIG. 1, each of the ADCs 180 are on the same side of the color filter array. Because the width of the CDS (or ADC) must be same to the pitch of the unit pixel, it is difficulty to lay out a high performance CDS(or ADC) in one column pitch.

Figure 2:
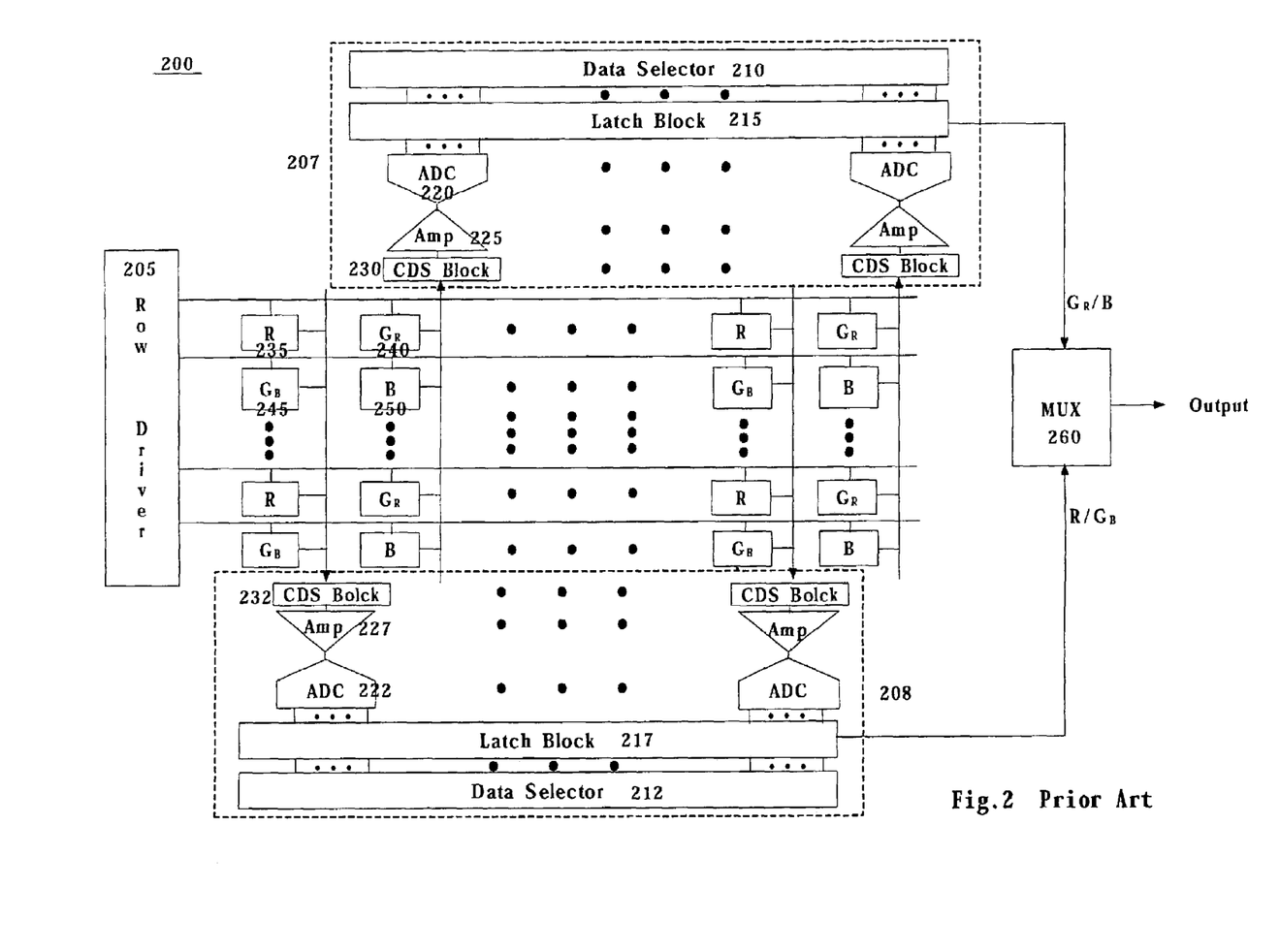
FIG. 2 illustrates another conventional CMOS image sensor.

Another design which permits high performance ADC within one column pitch is illustrated in FIG. 2. In FIG. 2, odd/even column circuits are split between opposite sides of the color filter array, for example, the top and bottom of the color filter array.

Operation of the CMOS image sensor 200 in FIG. 2 is similar to that of the CMOS image sensor 100 of FIG. 1. Each electric signal from a red pixel 235, $G_R$ pixel 240, $G_B$ pixel 245 and blue pixel 250 is input to one of column ADC blocks 207, 208. As shown in FIG. 2, the signals from each pixel in an odd column of pixels are processed in a lower column ADC block 208 which is located under the pixel array. The ADC block 208 includes CDS blocks 232, amplifiers 227, ADCs 222, a latch block 217, and a data selector 210. The signals from each pixel in an even column of pixels are processed in the upper column ADC block 207 above the pixel array. The ADC block 207 also includes CDS blocks 230, amplifiers 225, ADCs 220, a latch block 215, and a data selector 212.

After a digital signal from the ADC 220 or 222 is latched in the latch block 215 or 217, the data selector 210 or 212 outputs the data to a multiplexer (MUX) 260. The MUX 260 arranges both data from the upper and lower column ADC blocks 207, 208 in series and outputs the serialized data to an image signal processor (not shown).

Figure 3:
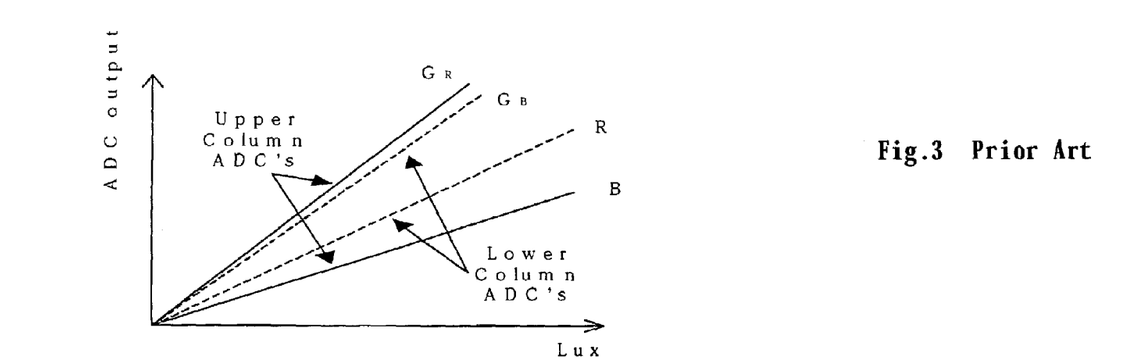
FIG. 3 is a graph which shows a difference in light sensitivity between $G_R$ and $G_B$ pixels, compared to an increasing quantity of received light intensity.

Due to the spatial difference between the upper column ADC block 207 and the lower column ADC block 208, fixed pattern noise (FPN) is generated. FPN, also called non-uniformity, is a spatial variation, due to device and interconnect parameter variations across the CMOS image sensor 200. FIG. 3 is a graph of which shows a difference in light sensitivity between $G_R$ and $G_B$ pixels, compared to an increasing quantity of received light intensity.

The slope of each curve indicates a gain of each color. The red and blue color pixels each have one slope. However, the green color has two slopes, one for the $G_R$ pixels processed by ADC block 207 and one for the $G_B$ pixels processed by ADC block 208.

Figure 4A:
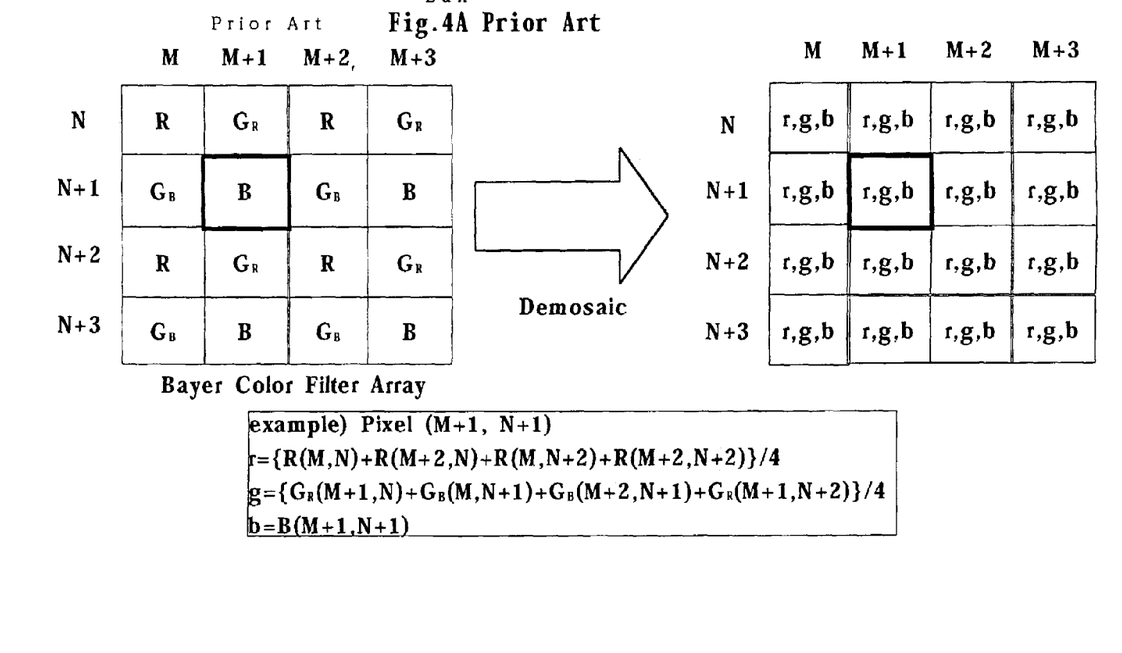
FIG. 4A illustrates a conventional demosaic method for both red and blue pixels.
Figure 4B:
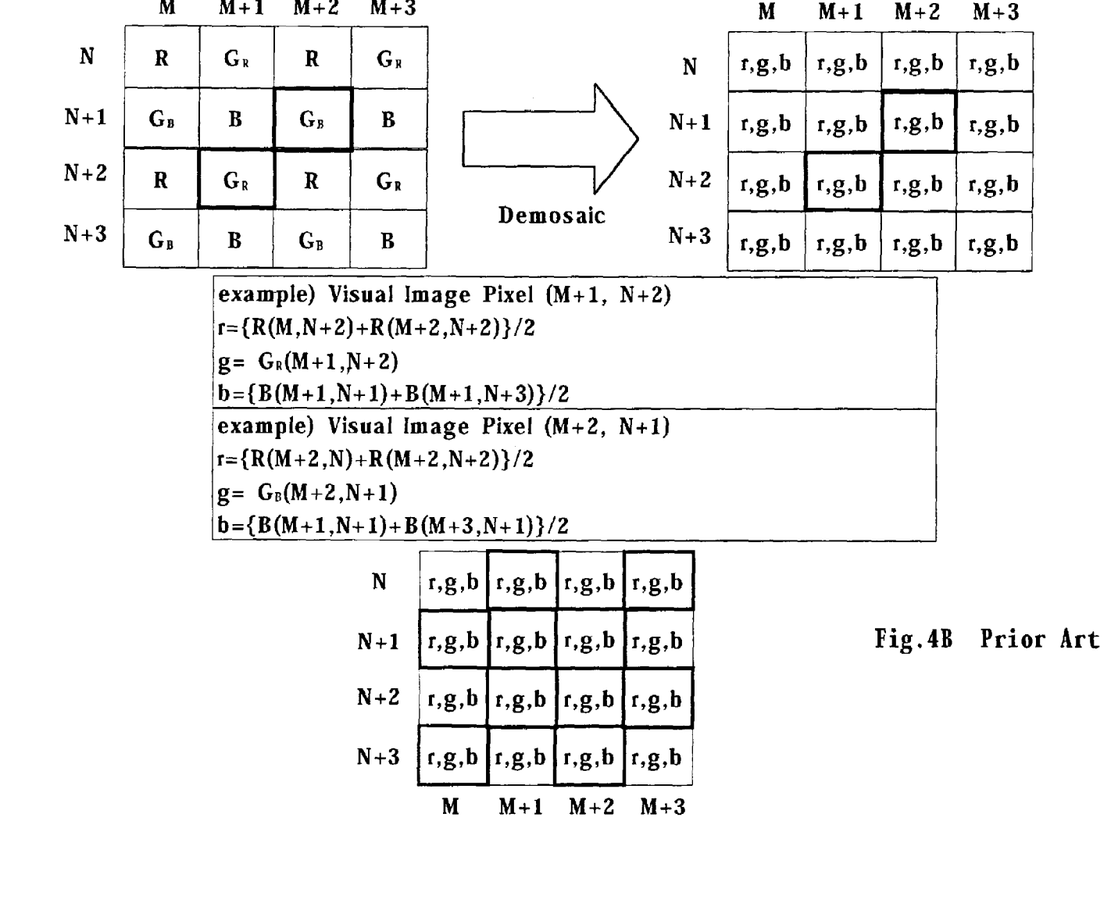
FIG. 4B illustrates a conventional demosaic method for both $G_R$ and $G_B$ pixels.
Figure 5A:
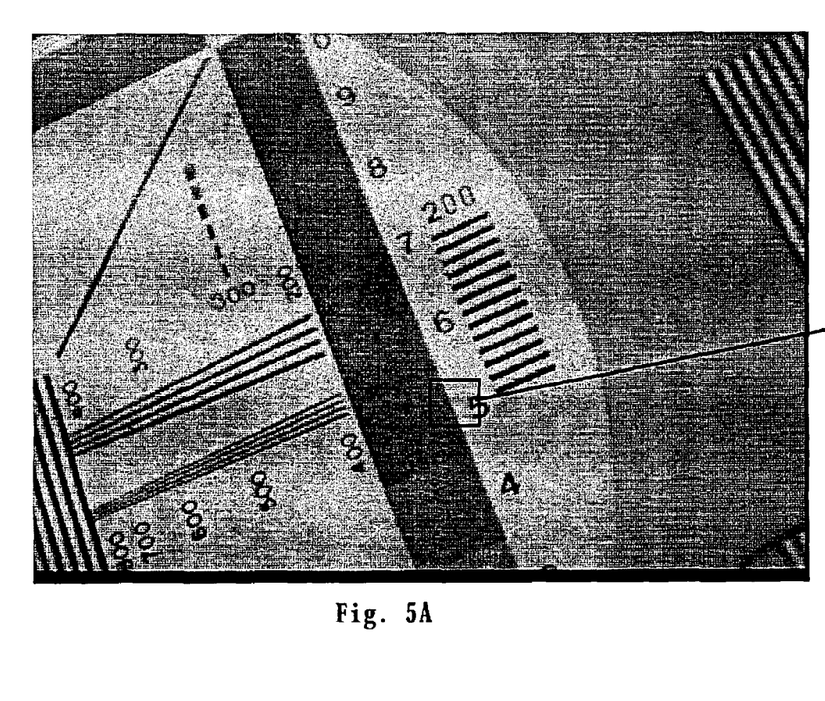
FIGS. 5A and 5B illustrate an undesirable "checker" pattern in an image produced by the conventional CMOS image sensor of FIG. 2.
Figure 5B:
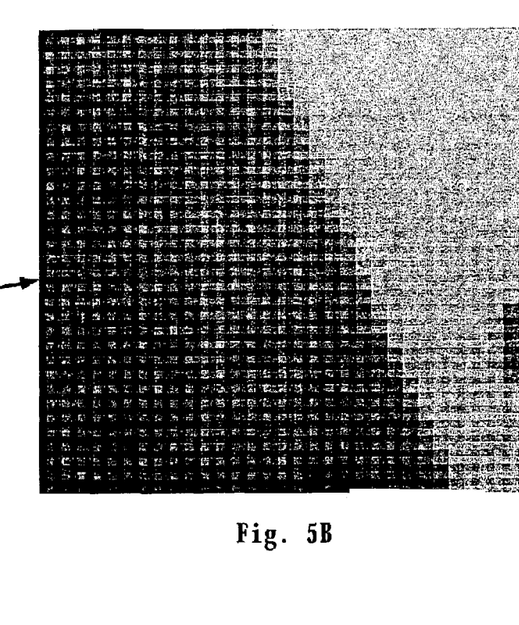

FIG. 4A illustrates a conventional demosaic method for both the red 235 and blue 250 pixels. As shown in the illustration of FIG. 4A and the associated calculation, for the red 235 and blue 250 pixels in the color filter array, the difference between the green color gains $G_R$ and $G_B$ does not degrade the image. However, FIG. 4B illustrates a conventional demosaic method for both the $G_R$ 240 and $G_B$ 245 pixels. As shown in the illustration of FIG. 4B and the associated calculation, for the $G_R$ 240 and $G_B$ 245 pixels in the color filter array, the difference between the green color gains $G_R$ and $G_B$ does degrade the image. This difference is manifested as a "checker pattern" in the image and can result in significant image quality degradation. This undesirable "checker pattern" is illustrated in FIGS. 5A and 5B.

SUMMARY OF THE INVENTION

In exemplary embodiments, the present invention is directed to a circuit and method for reducing fixed pattern noise.

In exemplary embodiments, the present invention is directed to an image sensor, which includes a switching device for establishing a connection between at least one column line and one of at least two analog-to-digital converter blocks, where at least one of the at least two analog-to-digital converter blocks is connectable to at least two columns of a plurality of unit pixels.

In exemplary embodiments, the present invention is directed to an image sensor, which includes a switching device, where, if the row line is odd, the switching device connects column outputs from odd column lines of an active pixel sensor array to a first correlated double sampling block and connects column outputs from even column lines of the active pixel sensor array to a second correlated double sampling block and if the row line is even, connects column outputs from odd column lines of the active pixel sensor array to the second correlated double sampling block and connects column outputs from even column lines of the active pixel sensor array to the first correlated double sampling block.

In exemplary embodiments, the present invention is directed to an image sensor, which includes a switching device for connecting a first subset of a plurality of unit pixels to a first correlated double sampling block and a second subset of the plurality of unit pixels to a second correlated double sampling block, where the first subset of the plurality of unit pixels are blue and red pixels and the second subset of the plurality of unit pixels are green pixels.

In exemplary embodiments, the image sensor is a CMOS sensor.

In exemplary embodiments, the present invention is directed to a method of reducing fixed pattern noise by establishing a connection between at least one column line and one of at least two analog-to-digital converter blocks, where at least one of the at least two analog-to-digital converter blocks is connectable to at least two columns of a plurality of unit pixels.

In exemplary embodiments, the present invention is directed to a method of reducing fixed pattern noise by establishing a connection between at least one column line and at least one analog-to-digital converter block, wherein the at least one analog-to-digital converter block is connectable to at least two columns of the plurality of unit pixels.

In exemplary embodiments, the present invention is directed to a method of reducing fixed pattern noise by connecting a first subset of a plurality of unit pixels to a first correlated double sampling block and a second subset of the plurality of unit pixels to a second correlated double sampling block, where the first subset of the plurality of unit pixels are blue and red pixels and the second subset of the plurality of unit pixels are green pixels.

In exemplary embodiments, the present invention is directed to a method of reducing fixed pattern noise by connecting at least one analog-to-digital converter to at least two columns of a plurality of unit pixels.

In exemplary embodiments, the present invention is directed to a method of reducing fixed pattern noise by selecting a row line of an active pixel sensor array including a plurality of unit pixels, where if the row line is odd, connecting column outputs from odd column lines of the active pixel sensor array to a first correlated double sampling block and connecting column outputs from even column lines of the active pixel sensor array to a second correlated double sampling block, and if the row line is even, connecting column outputs from odd column lines of the active pixel sensor array to the second correlated double sampling block and connecting column outputs from even column lines of the active pixel sensor array to the first correlated double sampling block.

In exemplary embodiments, the method of reducing fixed pattern noise is performed in a CMOS sensor.

In exemplary embodiments of the present invention, all red and blue pixels of the active pixel sensor array are processed by one of at least two analog-to-digital converter blocks and all green pixels of the active pixel sensor array are processed by another analog-to-digital converter block.

In exemplary embodiments of the present invention, the processing by the analog-to-digital converter blocks includes sampling, amplifying, and converting.

In exemplary embodiments of the present invention, the switching device includes at least two sets of switches, one set of switches to connect one analog-to-digital converter block to the active pixel sensor array and a second set to connect another analog-to-digital converter block to the active pixel sensor array.

In exemplary embodiments of the present invention, the switching device includes at least two sets of analog multiplexers, one set of multiplexers to connect one analog-to-digital converter block to the active pixel sensor array and a second set to connect another analog-to-digital converter block to the active pixel sensor array.

In exemplary embodiments of the present invention, each of the analog-to-digital converter blocks includes a correlated double sampling block for holding an image sample, an amplifier for amplifying the image sample, an analog-to-digital converter for converting input an analog sample to a digital signal, a latch block for latching the digital signals from the analog-to-digital converter, and a data selector for serially outputting signals in accordance with a selection signal.

In exemplary embodiments of the present invention, the image sensor further includes a multiplexer for outputting a signal from one of the latch blocks in response to one of the data selectors.

In exemplary embodiments of the present invention, the connection is established between the column line and one of the analog-to-digital converter blocks in response to a signal from one of a timing generator and an address generator.

In exemplary embodiments of the present invention, the signal is one of an odd/even signal and a select signal.

In exemplary embodiments of the present invention, each of the plurality of unit pixels includes photo-detector and a processing circuit which includes a reset circuit for generating a reset level signal and an amplifying circuit for amplifying a signal from the photo-detector and the reset level signal.

In exemplary embodiments of the present invention, the processing circuit includes a plurality of transistors.

In exemplary embodiments of the present invention fixed pattern noise is reduced.

BRIEF DESCRIPTION OF THE DRAWINGS

The present invention will become more apparent by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail with reference to the attached drawings. However, the exemplary embodiments of the present invention can be modified into various other forms, and the scope of the present invention must not be interpreted as being restricted to the exemplary embodiments described herein. The exemplary embodiments are provided to more completely explain the present invention to those skilled in the art. In the drawings, like reference numerals in the drawings denote the same elements.

Figure 6:
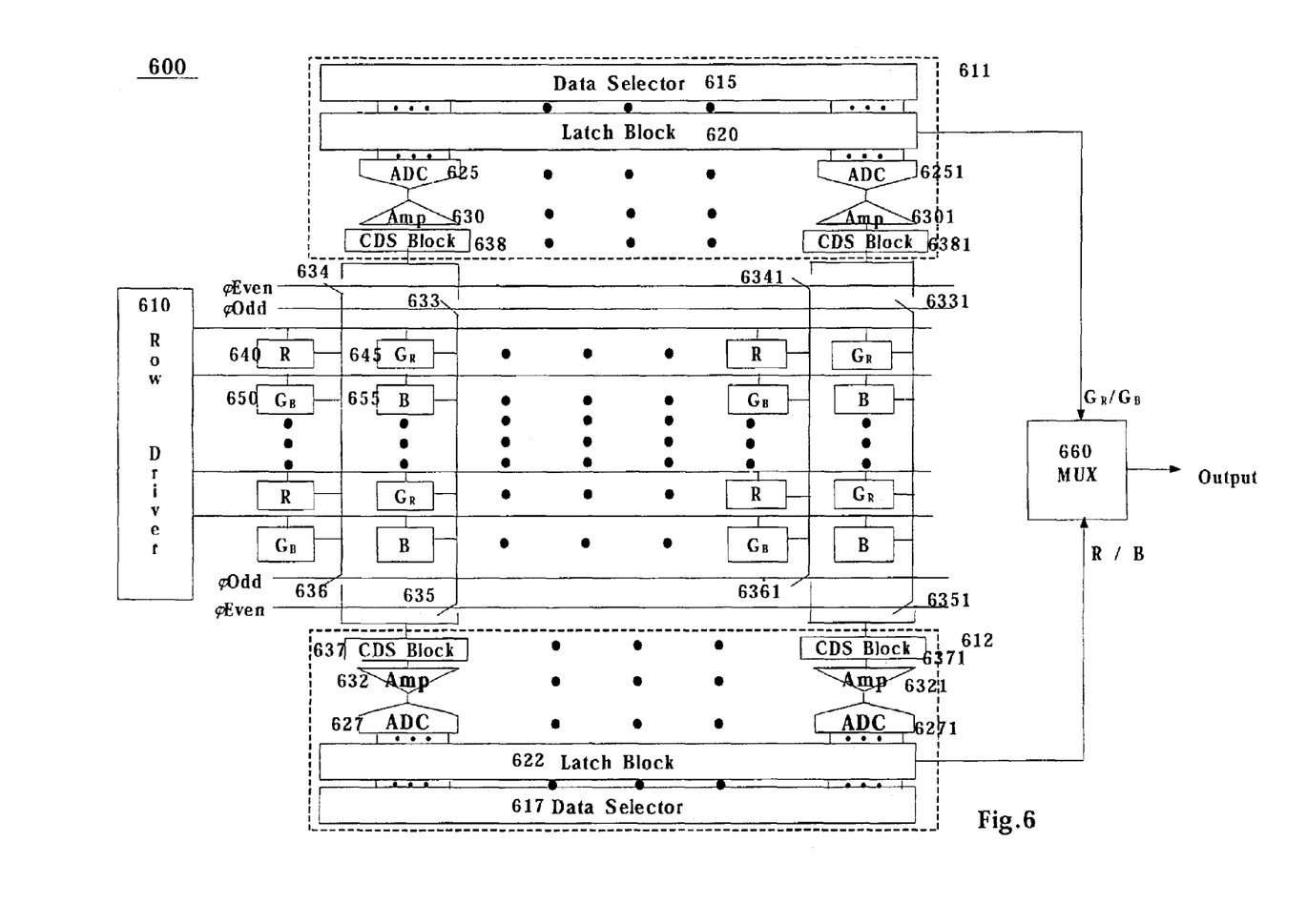
FIG. 6 illustrates a CMOS image sensor in an exemplary embodiment of the present invention.

FIG. 6 shows a CMOS image sensor 600 in an exemplary embodiment of the present invention. The color pixel array has three types of pixels, red 640, blue 655 and green 645, 650. $G_R$ 645 is a green pixel located in the same row as a red pixel 640, and $G_B$ 650 is a green pixel located in same row as a blue pixel 655. Row driver 610 selects a row line in series, for example from top to bottom in response to a signal generated by a timing generator or an address generator (not shown). When a first row line is selected, the red pixel 640, $G_R$ pixel 645, etc . . . in the first row are activated. When a second row line is selected, the $G_R$ pixel 650, blue pixel 645, etc . . . in the second row are activated.

The CMOS image sensor 600 also includes an upper ADC block 611 and a lower ADC block 612, a plurality of switches 633, 634, 635, 636, and a multiplexer (MUX) 660. The upper ADC block 611 includes a plurality of CDS blocks (638, . . . , 6381), amplifiers (630, . . . 6301), ADCs (625, . . . 6251), a latch block 620, and a data selector 615. The lower ADC block 612 includes a plurality of CDS blocks (637, . . . 6371), amplifiers (632, . . . 6321), ADCs (627, . . . 6271), a latch block 622, and a data selector 617.

Figure 7:
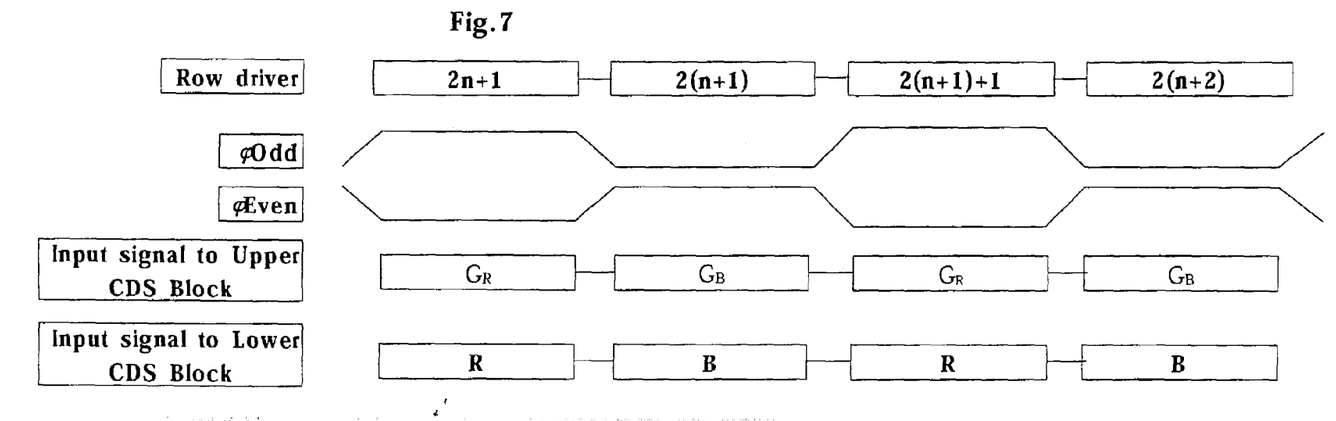
FIG. 7 illustrates a timing diagram in the exemplary embodiment of FIG. 6.

With reference to the timing diagram in FIG. 7, the φ odd selection signal from a timing generator or an address generator connects a switch, for example, switch 636 of the first column line to a lower ADC block 612, in particular, a CDS block 637, an amplifier 632, and an ADC 627 and a switch, for example, switch 633 of the second column line to an upper ADC block 611, in particular, a CDS block 638, an amplifier 630, and an ADC 625. As illustrated in FIG. 7, during the first period, 2n+1, the data for the red pixel 640 is provided to the lower ADC block 612 by closing switch 636. Similarly, during the first period, 2n+1, the data for the $G_R$ pixel 645 is provided to the upper ADC block 611 by closing switch 633.

In a second period, 2(n+1), the data for the $G_B$ pixel 650 is provided to the upper ADC block 611 by closing switch 634. Similarly, during the second period, 2(n+1), the data for the blue pixel 655 is provided to the lower ADC block 612 by closing switch 635. The third period, 2(n+1)+1 and the fourth period, 2(n+2) and all subsequent periods, are processed similarly.

As described above, both the $G_R$ pixel 645 and the $G_B$ pixel 650 are processed by the same ADC block, in this example, the upper ADC block 611.

An electric signal charged in the CDS block 638 is amplified by amplifier 630, converted to a digital signal by the ADC 625 and latched in the latch block 620. As described above, while the upper ADC block 611 processes the signals from the even column lines, the lower ADC block 612 processes the signals from the odd column lines. All signals from each column in the selected row may be processed in each upper and lower blocks at the same time.

The latched digital data in the latch blocks 620, 622 is output to the MUX 660 according to a selection signal from corresponding data selectors 615, 617. The MUX 660 block has at least two input ports. The first port is connected to upper ADC block 611 and the second port is connected to the lower ADC block 612. Inputs from the upper ADC block 611 contains data related to the green pixels ($G_R$ and $G_B$) and inputs from the lower ADC block 612 contain data related to the red and blue pixels.

Figure 8:
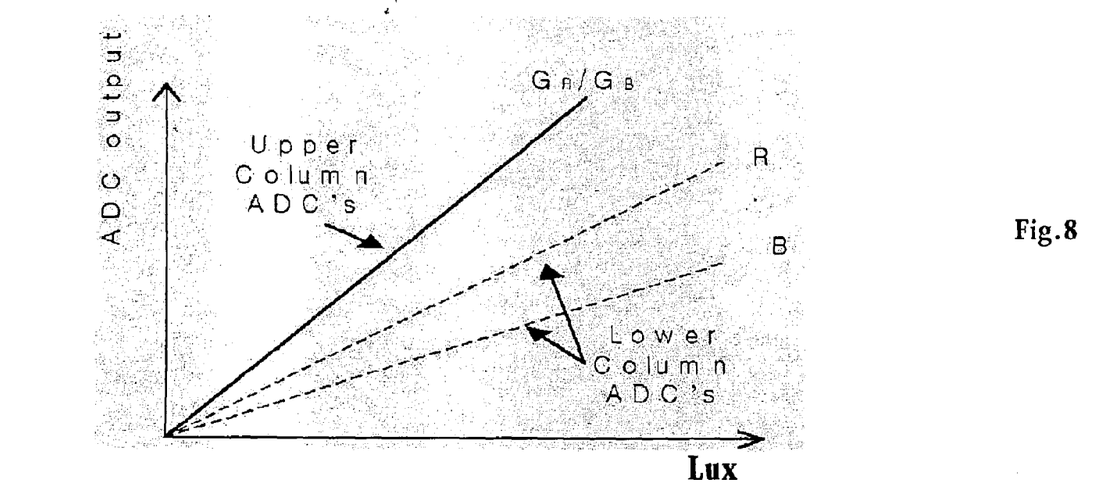
FIG. 8 is a graph which shows substantially equal light sensitivity for $G_R$ and $G_B$ pixels, compared to an increasing quantity of received light intensity.

Because the signals from the $G_R$ and $G_B$ are sampled, amplified and converted to digital signals in the upper ADC block 611, as shown FIG. 8, the slopes for $G_R$ and $G_B$ are identical or substantially identical, and there is little or no spatial characteristic variation (fixed pattern noise).

Figure 9A:
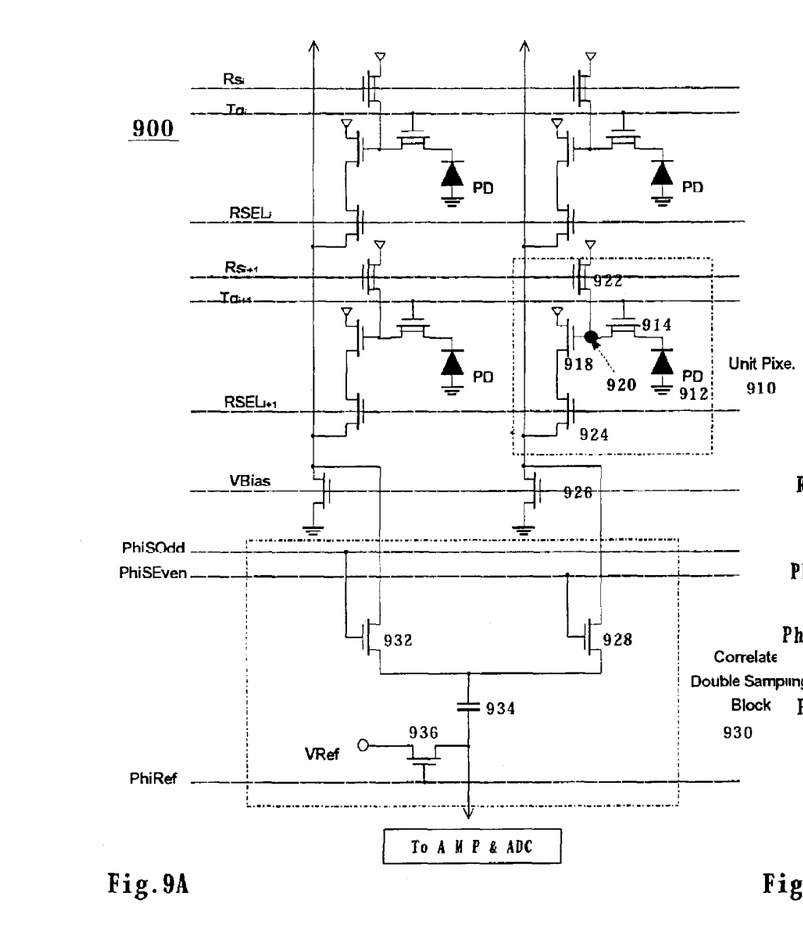
FIG. 9A illustrates an exemplary implementation in an exemplary embodiment of the present invention.
Figure 9B:
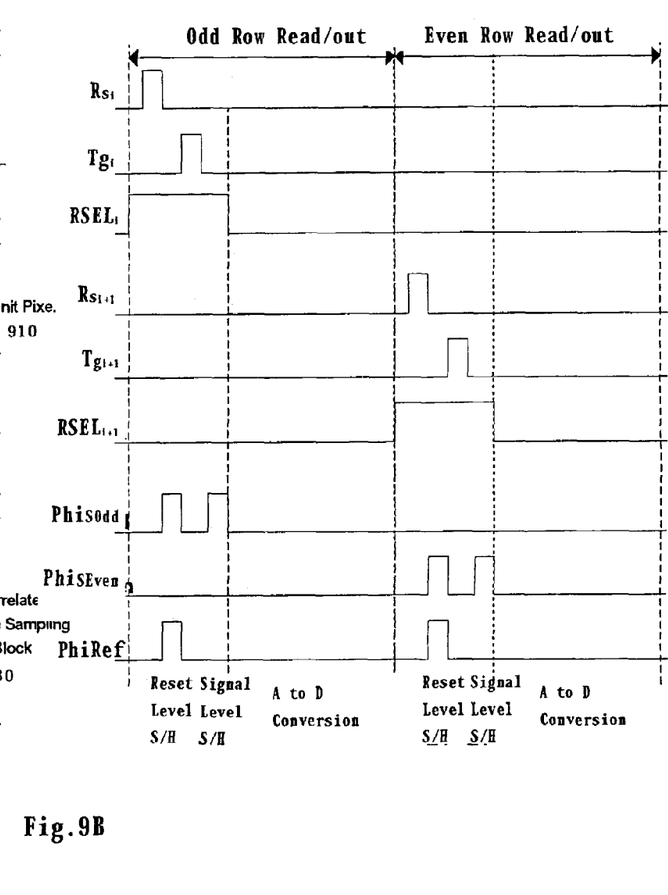
FIG. 9B illustrates a timing diagram in the exemplary embodiment of FIG. 9A.

FIGS. 9A and 9B illustrate an exemplary implementation of some of the elements of the exemplary embodiment of the present invention and a timing diagram of the exemplary implementation, respectively.

An exemplary unit pixel 910, such as any of red 640, blue 655, $G_R$ 645, or $G_B$ 650 may include a photo-detector, for example photodiode 912 and four transistors 914, 918, 922, 924. An exemplary CDS block, such as CDS block 637, may include three transistors 928, 932, 936 and a capacitor 934.

The operation of the exemplary implementation of FIG. 9A is explained with reference to the timing diagram of FIG. 9B. The timing diagram of FIG. 9B specifically describes the operation of a pixel in the second row and second column of the pixel array.

A row selection signal $RSEL_{i+1}$ line goes to a first logic state (in an exemplary embodiment, a HIGH logic state) in accordance with a selection signal from a row driver. When the row selection signal $RSEL_{i+1}$ line goes to the first logic state, a pixel reset signal $Rs_{i+1}$ toggles and a node 920 is fixed at a reset signal which level is a reset level. The reset signal is amplified by the transistor 918 and is supplied to the drain of transistor 928 via transistor 924. Because the unit pixel 910 is located in an even row, when the PhisEven signal (a signal for the even row) toggles, the reset signal from the unit pixel 910 is charged in capacitor 934.

When the PhiRef signal (the signal for the reference voltage) toggles, a constant reference voltage ($V_{Ref}$) is supplied to the lower terminal of the capacitor 934. At this time, a voltage of the upper terminal of capacitor 934 is $V_{Reset}$ and a voltage of the lower terminal of capacitor 934 is $V_{Ref}$.

After the reset signal is charged in the capacitor 634, the transistor 936 is turned off in response to the PhiRef signal (the $V_{Ref}$ is no more supplied to the lower terminal of the capacitor 934), a $Tg_{i+1}$ signal toggles to turn on a transfer gate, and the transistor 914 is turned on, and an optical signal integrated in photodiode 912 is transferred to the node 920 by the shape of an electric signal (hereinafter also referred to as the image signal).

The image signal at the node 920 is amplified and transferred to the drain of the transistor 928. When the PhisEven signal toggles again, the image signal is charged in the capacitor 934. At this time, the voltage of the upper terminal of capacitor 934 is $V_{image\_signal}$, and the voltage of the lower terminal of capacitor 634 is $V_{Ref}$-($V_{Reset}$-$V_{Image\_signal}$) wherein $V_{Reset}$-$V_{Image\_signal}$ is a signal which represents a pure image signal. Subsequently, the pure image signal is amplified and digitized in an amplifier and ADC, such as amplifier 632 and ADC 627.

Figure 10:
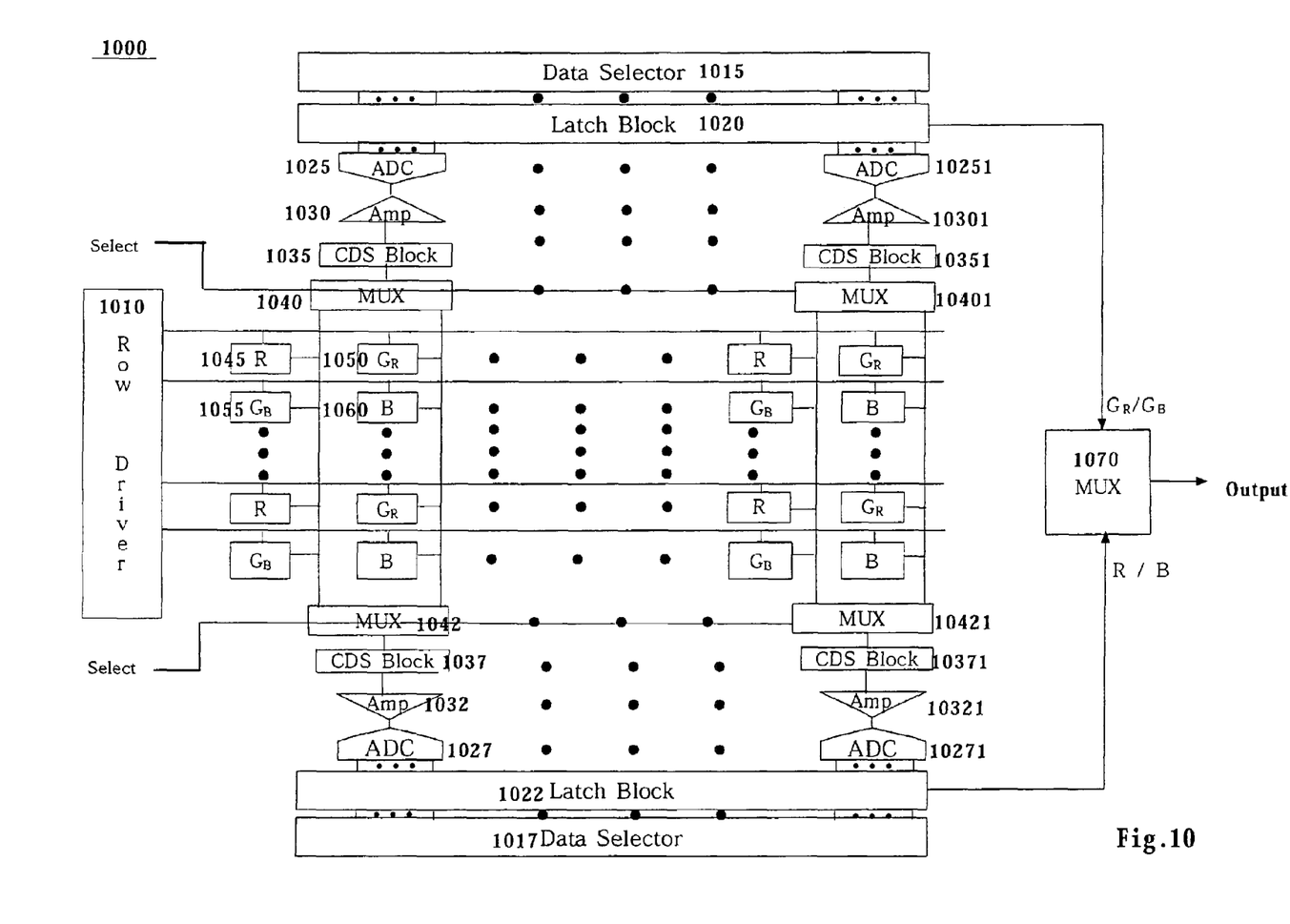
FIG. 10 illustrates a CMOS image sensor in another exemplary embodiment of the present invention.

FIG. 10 shows another exemplary embodiment of the present invention. Like reference numeral in FIGS. 6 and 10 represent like elements. In FIG. 10, analog multiplexers MUX 1042, 1040 replace the switches 633, 634 of FIG. 6 and a selection signal SELECT is input to the MUX 1042 from the timing generator or address generator.

Figure 11:
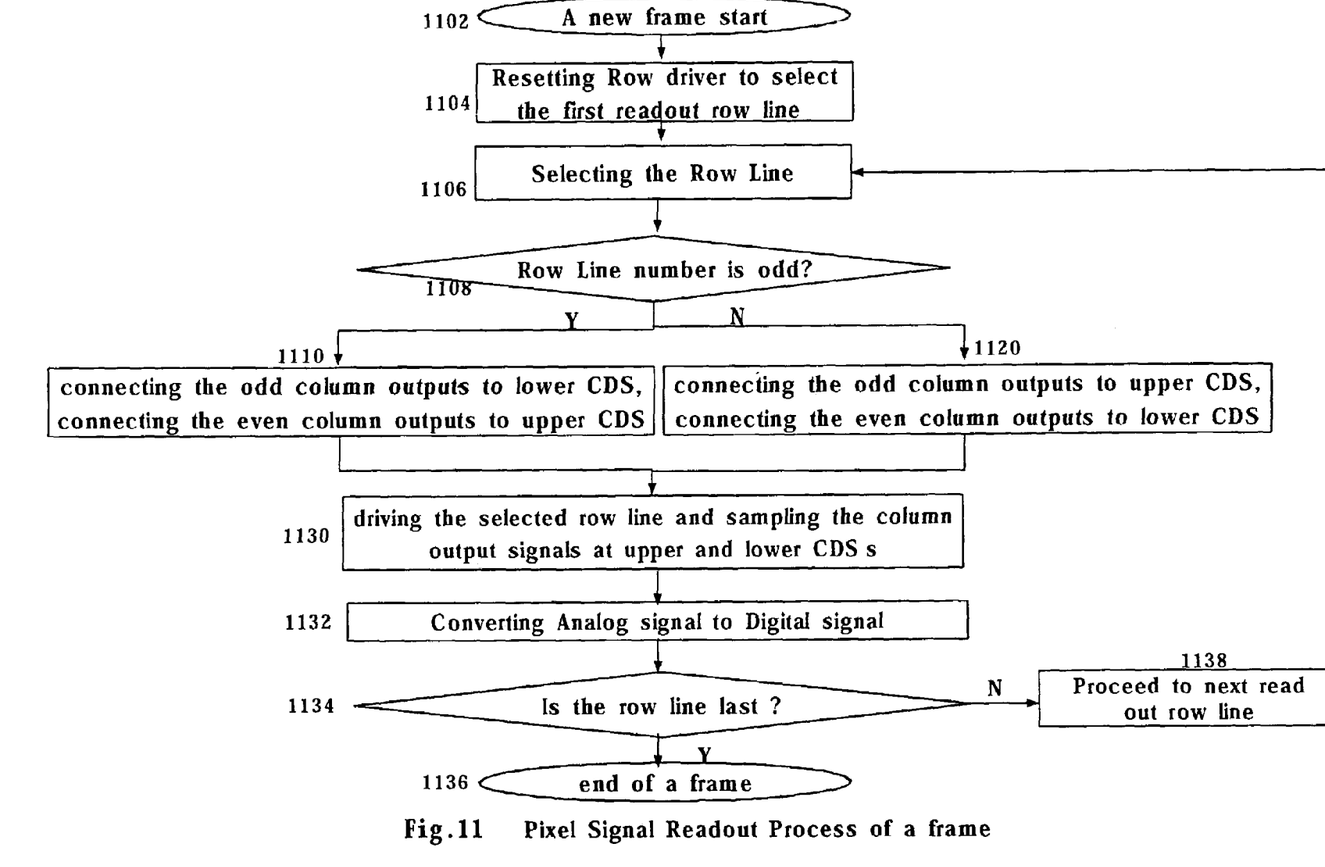
FIG. 11 is a flowchart illustrating another exemplary embodiment of the present invention.

FIG. 11 illustrates another exemplary embodiment of the present invention. As illustrated in the exemplary flow chart of FIG. 11, a new frame is received in step 1102. The row driver is reset to select the readout row line in step 1104 and the row line is selected in step 1106. If the row line number is odd, as determined in step 1108, the odd column outputs are connected to a first CDS block (for example a lower CDS block) and even column outputs are connected to a different CDS block, such as upper CDS block, as set forth in step 1110. If the row line number is even, the odd column outputs are connected to the first CDS block, for example the upper CDS block and the even column outputs are connected to a different CDS block, such as the lower CDS block, in step 1120. Once the connections are made in steps 1110 or 1120, the selected row line is driven and the column output signals are sampled at the upper and lower CDS blocks in step 1130. In step 1132, the analog signals are converted to a digital signal. In step 1134, if the row line is the last line, then the frame is ended at step 1136. If the row line is not the last line, the flowchart proceeds to the next read out row line at step 1138 and returns to step 1106 to select the next row line.

Figure 12:
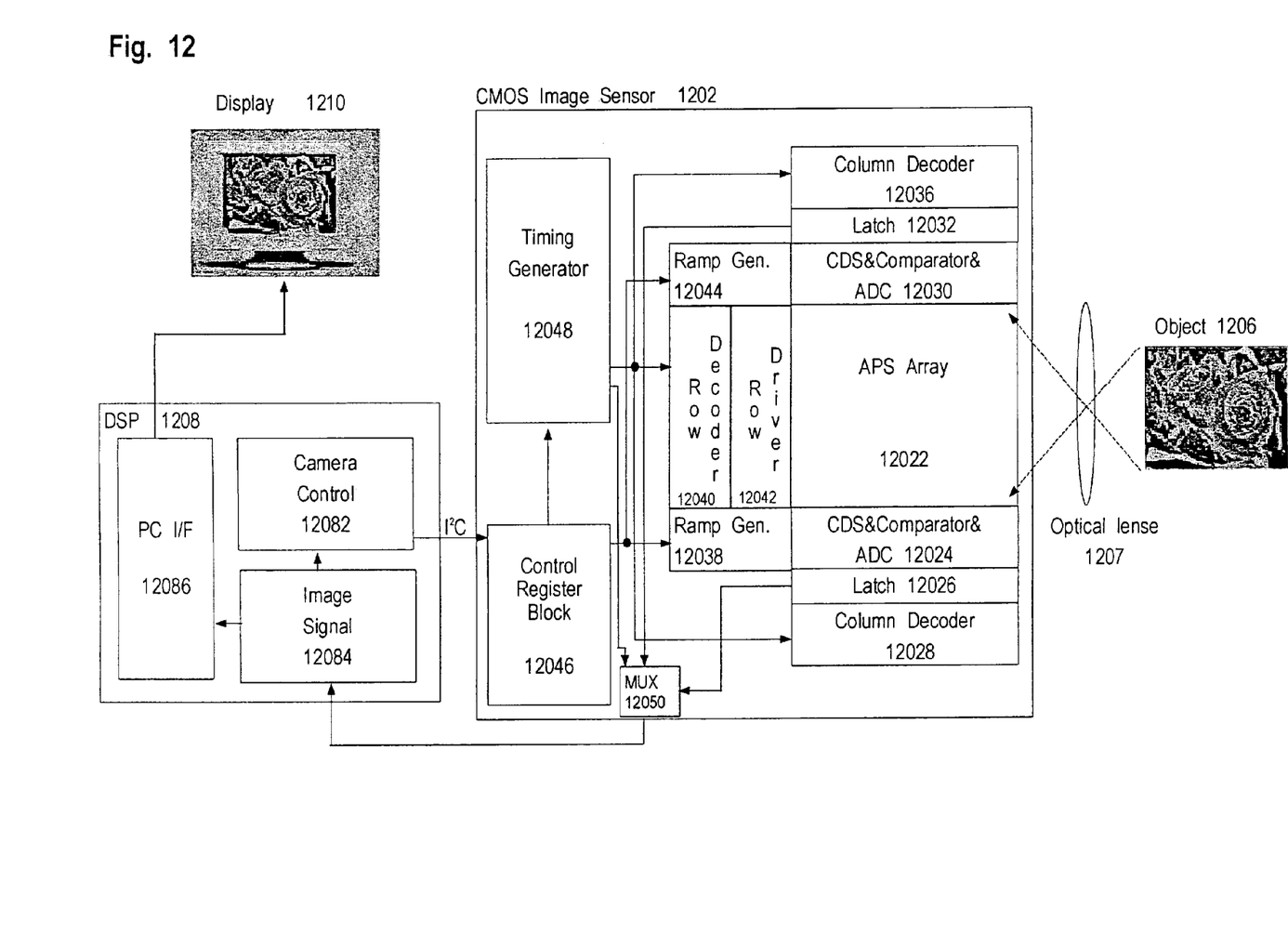
FIG. 12 illustrates a system including the CMOS image sensor of either FIG. 6 or FIG. 10.

The exemplary CMOS image sensors of FIGS. 6 and 10 may be employed in a larger system 1200, as illustrated in FIG. 12. The CMOS image sensor 1202 receives an optical signal of an object 1206, via an optical lens 1207 and produces image data which is supplied to a digital signal processor (DSP) 1208, which produces a display 1210. The CMOS image sensor 1202 of FIG. 12 may be either the CMOS image sensor of FIG. 6 or the CMOS image processor of FIG. 10. In an exemplary embodiment, the CMOS image sensor 1202 includes an active pixel sensor array 12022, two CDS&Comparator&ADCs (12024 and 12030), two latches (12026 and 12032), two column decoders (12028 and 12036) a MUX 12050, two ramp generators (12038 and 12044), a row decoder 12040 and a row driver 14042. The CMOS image sensor 1202 may also include a control register block 12046 and a timing generator 12048.

As indicated above, the CMOS image sensor 1202 provides image data to the DSP 1208 and also sends and receives control information therebetween. The DSP 1208 may include a camera controller 12082 and image signal processor 12084, and a computer interface (PC I/F) 12086 for producing an electric image on display 1210. The CMOS image sensors and methods of the present invention, reduce fixed pattern noise, so that the displayed optical signal is an accurate representation of the original optical signal from the original object.

As illustrated in FIG. 12, the CMOS image sensors of the exemplary embodiments of the present invention receive an optical signal of an object and transform the optical signal into an electrical signal. The electrical signal produced by the CMOS image sensor of the exemplary embodiments of the present invention may be further processed, utilizing various techniques, such as signal processing and/or image recognition and are retransformed into optical signals for display.

Although the present invention has been described with respect to the exemplary embodiments indicated above, any variations could be made to the present invention. For example, although the present invention has been described in the context of a CMOS image sensor, other sensors other than CMOS image sensors could also benefit from the various invented concepts of the present invention. Further, it would be obvious to one ordinary skill in the art, that the block diagrams of FIGS. 6 and 10, the circuit diagram of FIG. 9A, the timing diagram of FIG. 9B, the flowchart of FIG. 11 and the system of FIG. 12 are exemplary and could be replaced with equivalent block diagrams, circuit diagrams, timing diagrams, flowcharts, and systems.

Although the invention has been described with reference to exemplary embodiments, it will be apparent to one of ordinary skill in the art that modifications of the described embodiments may be made without departing from the spirit and scope of the invention.

What we claim is:

1. An image sensor for reducing fixed pattern noise, comprising:
    an active pixel sensor array including a plurality of unit pixels;
    a row driver for selecting at least one row line of the active pixel sensor array;
    at least two analog-to-digital converter blocks;
    a switching device for establishing a connection between at least one column line and one of the at least two analog-to-digital converter blocks; wherein
        the at least two analog-to-digital converter blocks are connectable to at least two columns of the plurality of unit pixels;
        each of the at least two analog-to-digital converter blocks includes a plurality of analog-to-digital converters and a latch block for latching the digital signals from at least one of the plurality of analog-to-digital converters,
        each of the plurality of analog-to-digital converters further being connectable to at least two of the at least two columns of the plurality of unit pixels,
        at least one of the at least two analog-to-digital converter blocks is configured to process signals from each non-adjacent column in the selected row line simultaneously; and
    a multiplexer for outputting a signal from the latch block.

2. The image sensor of claim 1, wherein all red and blue pixels of the active pixel sensor array are processed by one of the at least two analog-to-digital converter blocks and all green pixels of the active pixel sensor array are processed by another one of the at least two analog-to-digital converter blocks.

3. The image sensor of claim 2, wherein the processing by the at least two analog-to-digital converter blocks includes sampling, amplifying, and converting.

4. The image sensor of claim 1, said switching device comprising at least two sets of switches, one set of switches to connect one of the at least two analog-to-digital converter blocks to the active pixel sensor array and a second set to connect another of the at least two analog-to-digital converter blocks to the active pixel sensor array.

5. The image sensor of claim 1, said switching device comprising at least two sets of analog multiplexers, one set of multiplexers to connect one of the at least two analog-to-digital converter blocks to the active pixel sensor array and a second set to connect another of the at least two analog-to-digital converter blocks to the active pixel sensor array.

6. The image sensor of claim 1, each of said at least two analog-to-digital converter blocks further including,
    a correlated double sampling block for holding an image sample,
    an amplifier for amplifying the image sample, and
    a data selector for serially outputting signals in accordance with a selection signal.

7. The image sensor of claim 1, wherein the connection is established between the at least one column line and one of the at least two analog-to-digital converter blocks in response to a signal from one of a timing generator and an address generator.

8. The image sensor of claim 7, wherein the signal is one of an odd/even signal and a select signal.

9. The image sensor of claim 8, each of said plurality of unit pixels including a photo-detector and a processing circuit which includes a reset circuit for generating the reset level signal and an amplifying circuit for amplifying a signal from the photo-detector and the reset level signal.

10. The image sensor of claim 9, wherein said processing circuit includes a plurality of transistors.

11. An image sensor for reducing fixed pattern noise, comprising:
    an active pixel sensor array including a plurality of unit pixels;
    a row driver for selecting at least one row line of the active pixel sensor array;
    at least two analog-to-digital converter blocks;
    switching means for establishing a connection between at least one column line and one of the at least two analog-to-digital converter blocks; wherein the at least two analog-to-digital converter blocks are connectable to at least two columns of the plurality of unit pixels, each of the at least two analog-to-digital converter blocks includes a plurality of analog-to-digital converters and a latch block for latching digital signals from at least one of the plurality of analog-to-digital converters, each analog-to-digital converter of the plurality of analog-to-digital converters of each of the at least two analog-to-digital converter blocks is further connectable to at least two of the at least two columns of the plurality of unit pixels, at least one of the at least two analog-to-digital converter blocks is configured to process signals from each non-adjacent column in the selected row line simultaneously; and a multiplexer for outputting a signal from the latch block.

12. The image sensor of claim 11, wherein all red and blue pixels of the active pixel sensor array are processed by one of the at least two analog-to-digital converter blocks and all green pixels of the active pixel sensor array are processed by another one of the at least two analog-to-digital converter blocks.

13. The image sensor of claim 12, wherein the processing by the at least two analog-to-digital converter blocks includes sampling, amplifying, and converting.

14. The image sensor of claim 11, said switching means comprising at least two sets of switches, one set of switches to connect one of the at least two analog-to-digital converter blocks to the active pixel sensor array and a second set to connect another of the at least two analog-to-digital converter blocks to the active pixel sensor array.

15. The image sensor of claim 11, said switching means comprising at least two sets of analog multiplexers, one set of multiplexers to connect one of the at least two analog-to-digital converter blocks to the active pixel sensor array and a second set to connect another of the at least two analog-to-digital converter blocks to the active pixel sensor array.

16. The image sensor of claim 11, each of said at least two analog-to-digital converter blocks further including,
a correlated double sampling block for holding an image sample,
an amplifier for amplifying the image sample, and
a data selector for serially outputting signals in accordance with a selection signal.

17. The image sensor of claim 11, wherein the connection is established between the at least one column line and one of the at least two analog-to-digital converter blocks in response to a signal from one of a timing generator and an address generator.

18. The image sensor of claim 17, wherein the signal is one of an odd/even signal and a select signal.

19. The image sensor of claim 11, each of said plurality of unit pixels including a photodetector and a processing circuit which includes a reset circuit for generating the reset level signal and an amplifying circuit for amplifying a signal from the photo-detector and the reset level signal.

20. The image sensor of claim 19, wherein said processing circuit includes a plurality of transistors.

21. An image sensor for reducing fixed pattern noise, comprising:
a row driver for selecting a row line of an active pixel sensor array including a plurality of unit pixels;
a switching device, if the row line is odd, for connecting column outputs from odd column lines of the active pixel sensor array to a first correlated double sampling block and connecting column outputs from even column lines of the active pixel sensor array to a second correlated double sampling block and if the row line is even, connecting column outputs from odd column lines of the active pixel sensor array to the second correlated double sampling block and connecting column outputs from even column lines of the active pixel sensor array to the first correlated double sampling block, wherein each of the first and second correlated double sampling blocks include a plurality of analog-to-digital converters, and are connectable to a latch block for latching digital signals from at least one analog-to-digital converter of the plurality of analog-to-digital converters, the at least one analog-to-digital converter of the plurality of analog-to-digital converters of each of the first and second correlated double sampling blocks is connectable to at least two columns of the plurality of unit pixels, and at least one of the first and second correlated double sampling blocks is configured to process signals from each non-adjacent column in the selected row line simultaneously; and a multiplexer for outputting a signal from the latch block.

22. The image sensor of claim 21, wherein all red and blue pixels of the active pixel sensor array are processed by the same correlated double sampling block and all green pixels of the active pixel sensor array are processed by the same correlated double sampling block.

23. The image sensor of claim 21, wherein processing after the first correlated double sampling block and the second correlated double sampling block includes amplifying and converting.

24. The image sensor of claim 21, said switching device comprising at least two sets of switches, one set of switches to connect one of the correlated double sampling blocks to the active pixel sensor array and a second set to connect another of the correlated double sampling blocks to the active pixel sensor array.

25. The image sensor of claim 21, said switching device comprising at least two sets of analog multiplexers, one set of multiplexers to connect one of the correlated double sampling blocks to the active pixel sensor array and a second set to connect another of the correlated double sampling blocks to the active pixel sensor array.

26. The image sensor of claim 21, each of said first and second correlated double sampling blocks further connected to
a correlated double sampling block for holding an image sample,
an amplifier for amplifying the image sample, and
a data selector for serially outputting signals in accordance with a selection signal.

27. The image sensor of claim 21, wherein the connection is established between the column outputs and the correlated double sampling blocks in response to a signal from one of a timing generator and an address generator.

28. The image sensor of claim 27, wherein the signal is one of an odd/even signal and a select signal.

29. The image sensor of claim 21, each of said plurality of unit pixels including a photodetector and a processing circuit which includes a reset circuit for generating a reset level signal and an amplifying circuit for amplifying a signal from the photo-detector and the reset level signal.

30. The image sensor of claim 29, wherein said processing circuit includes a plurality of transistors.

31. An image sensor for reducing fixed pattern noise, comprising:
  an active pixel sensor array including a plurality of unit pixels;
  a switching device for connecting a first subset of the plurality of unit pixels to a first correlated double sampling block and a second subset of the plurality of unit pixels to a second correlated double sampling block; wherein
    the first subset of the plurality of unit pixels are blue and red pixels and the second subset of the plurality of unit pixels are green pixels,
    each of the first and second correlated double sampling blocks include a plurality of analog-to-digital converters, and are connectable to a latch block for latching digital signals from at least one analog-to-digital converter of the plurality of analog-to-digital converters,
    the at least one analog-to-digital converter of the plurality of analog-to-digital converters of each of the first and second correlated double sampling blocks is further connectable to at least two columns of the plurality of unit pixels, and
    at least one of the first and second correlated double sampling blocks is configured to process signals from each non-adjacent column in a selected row line simultaneously; and
  a multiplexer for outputting a signal from the latch block.

32. The image sensor of claim 31, wherein processing after the first correlated double sampling block and the second correlated double sampling block includes amplifying and converting.

33. The image sensor of claim 31, said switching device comprising at least two sets of switches, one set of switches to connect one of the correlated double sampling blocks to the active pixel sensor array and a second set to connect another of the correlated double sampling blocks to the active pixel sensor array.

34. The image sensor of claim 31, said switching device comprising at least two sets of analog multiplexers, one set of multiplexers to connect one of the correlated double sampling blocks to the active pixel sensor array and a second set to connect another of the correlated double sampling blocks to the active pixel sensor array.

35. The image sensor of claim 31, each of said first and second correlated double sampling blocks further connected to
  a correlated double sampling block for holding an image sample,
  an amplifier for amplifying the image sample, and
  a data selector for serially outputting signals in accordance with a selection signal.

36. The image sensor of claim 31, wherein the connection is established between the plurality of unit pixels and the correlated double sampling blocks in response to a signal from one of a timing generator and an address generator.

37. The image sensor of claim 36, wherein the signal is one of an odd/even signal and a select signal.

38. The image sensor of claim 31, each of said plurality of unit pixels including a photodetector and a processing circuit which includes a reset circuit for generating a reset level signal and an amplifying circuit for amplifying a signal from the photo-detector and the reset level signal.

39. The image sensor of claim 38, wherein said processing circuit includes a plurality of transistors.

40. An image sensor for reducing fixed pattern noise, comprising:
  an active pixel sensor array including a plurality of unit pixels arranged in rows and columns;
  a switching device for connecting at least one analog-to-digital converter block to at least two columns of the plurality of unit pixels; wherein
    the at least one analog-to-digital converter block includes a plurality of analog-to-digital converters,
    at least one analog-to-digital converter of the plurality of analog-to-digital converters is connectable to a latch block for latching digital signals from the at least one analog-to-digital converter,
    the at least one analog-to-digital converter of the plurality of analog-to-digital converters is further connectable to at least two of the at least two columns of the plurality of unit pixels, and
    the at least one analog-to-digital converter block is configured to process signals from each non-adjacent column in a selected row simultaneously; and
  a multiplexer for outputting a signal from the latch block.

41. The image sensor of claim 40, wherein all red and blue pixels of the active pixel sensor array are processed by one analog-to-digital converter block and all green pixels of the active pixel sensor array are processed by another analog-to-digital converter block.

42. The image sensor of claim 40, said switching device comprising at least two sets of switches, one set of switches to connect the at least one analog-to-digital converter block to the active pixel sensor array and a second set to connect the at least one analog-to-digital converter block to the active pixel sensor array.

43. The image sensor of claim 40, said switching device comprising at least two sets of analog multiplexers, one set of multiplexers to connect the at least one analog-to-digital converter block to the active pixel sensor array and a second set to connect the at least one analog-to-digital converter block to the active pixel sensor array.

44. The image sensor of claim 40, wherein the connection is established between the at least one analog-to-digital converter block and the at least two columns of the plurality of unit pixels in response to a signal from one of a timing generator and an address generator.

45. The image sensor of claim 44, wherein the signal is one of an odd/even signal and a select signal.

46. The image sensor of claim 40, each of said plurality of unit pixels including a photodetector and a processing circuit which includes a reset circuit for generating the reset level signal and an amplifying circuit for amplifying a signal from the photo-detector and the reset level signal.

47. The image sensor of claim 46, wherein said processing circuit includes a plurality of transistors.

48. A method of reducing fixed pattern noise, comprising:
  selecting at least one row line of an active pixel sensor array;
  establishing a connection between at least one column line and at least one of at least two analog-to-digital converter blocks; wherein
    the at least two analog-to-digital converter blocks are connectable to at least two columns of the plurality of unit pixels,
    each of the at least two analog-to-digital converter blocks includes a plurality of analog-to-digital converters, and a latch block for latching digital signals from at least one analog-to-digital converter of the plurality of analog-to-digital converters,
    the at least one analog-to-digital converter of the plurality of analog-to-digital converters of each of the at least two analog-to-digital converter blocks is connectable to at least two of the at least two columns of the plurality of unit pixels, and at least one of the at least two analog-to-digital converter blocks is configured to process signals from each non-adjacent column in the selected row line simultaneously; and outputting a signal from the latch block by multiplexing.

49. A method of reducing fixed pattern noise, comprising:

selecting at least one row line of an active pixel sensor array;

establishing a connection between at least one column line and at least one analog-to-digital converter block; wherein the at least one analog-to-digital converter block is connectable to at least two columns of the plurality of unit pixels, the at least one analog-to-digital converter block includes a plurality of analog-to-digital converters, and a latch block for latching digital signals from at least one analog-to-digital converter of the plurality of analog-to-digital converters, the at least one analog-to-digital converter of the plurality of analog-to-digital converters is connectable to at least two of the at least two columns of the plurality of unit pixels, and the at least one analog-to-digital converter block is configured to process signals from each non-adjacent column in the selected row line simultaneously; and outputting a signal from the latch block by multiplexing.

50. A method of reducing fixed pattern noise, comprising:

providing an image sensor including an active pixel sensor array including a plurality of unit pixels;

connecting a first subset of the plurality of unit pixels to a first correlated double sampling block and a second subset of the plurality of unit pixels to a second correlated double sampling block; wherein the first subset of the plurality of unit pixels are blue and red pixels and the second subset of the plurality of unit pixels are green pixels, each of the first and second correlated double sampling blocks includes a plurality of analog-to-digital converters, and are connectable to a latch block for latching digital signals from at least one analog-to-digital converter of the plurality of analog-to-digital converters, the at least one analog-to-digital converter of the plurality of analog-to-digital converters of each of the first and second correlated double sampling blocks is connectable to at least two columns of the plurality of unit pixels, and at least one of the first and second correlated double sampling blocks is configured to process signals from each non-adjacent column in a selected row line simultaneously; and outputting a signal from the latch block by multiplexing.

51. A method of reducing fixed pattern noise, comprising:

providing an image sensor including an active pixel sensor array including a plurality of unit pixels arranged in rows and columns;

connecting at least one analog-to-digital converter block to at least two columns of the plurality of unit pixels; wherein a reset level signal and a data signal are read out sequentially from one of the at least two column lines of the active pixel sensor array that is connected to the at least one analog-to-digital converter block, the at least one analog-to-digital converter block includes a plurality of analog-to-digital converters, and a latch block for latching digital signals from at least one analog-to-digital converter of the plurality of analog-to-digital converters, the at least one analog-to-digital converter of the plurality of analog-to-digital converters is further connectable to at least two of the at least two columns of the plurality of unit pixels, and the at least one analog-to-digital converter block is configured to process signals from each non-adjacent column in a selected row line simultaneously; and outputting a signal from the latch block by multiplexing.

52. A method of reducing fixed pattern noise, comprising:

selecting a row line of an active pixel sensor array including a plurality of unit pixels;

if the row line is odd, connecting column outputs from odd column lines of the active pixel sensor array to a first correlated double sampling block and connecting column outputs from even column lines of the active pixel sensor array to a second correlated double sampling block;

if the row line is even, connecting column outputs from odd column lines of the active pixel sensor array to the second correlated double sampling block and connecting column outputs from even column lines of the active pixel sensor array to the first correlated double sampling block;

driving the selected row line and sampling column output signals at both the first correlated double sampling block and the second correlated double sampling block;

converting an output analog signal to a digital signal; wherein each of the first and second correlated double sampling blocks includes a plurality of analog-to-digital converters, and are connectable to a latch block for latching digital signals from at least one analog-to-digital converter of the plurality of analog-to-digital converters, the at least one analog-to-digital converter of the plurality of analog-to-digital converters of each of the first and second correlated double sampling blocks is connectable to at least two columns of the plurality of unit pixels, and at least one of the first and second correlated double sampling blocks is configured to process signals from each non-adjacent column in the selected row line simultaneously; and outputting a signal from the latch block by multiplexing.

53. An image sensor for reducing fixed pattern noise, comprising:

an active pixel sensor array including a plurality of unit pixels;

a first and second plurality of analog-to-digital converter blocks, each of the first and second analog-to-digital converter blocks alternatively connecting to even and odd columns of the plurality of the unit pixels and including:

a correlated double sampling block for holding an image sample;

an amplifier for amplifying the image sample;

an analog-to-digital converter for converting input analog sample to a digital signal; and a latch block for latching digital signals from the analog-to-digital converter; wherein at least one of the first and second plurality of analog to digital converter blocks are configured to process signals from each non-adjacent column in a selected row line simultaneously; and a multiplexer for outputting a signal from the latch block.

54. The image sensor of claim 53, wherein all red and blue pixels of the active pixel sensor array are processed by the first plurality of analog-to-digital converter blocks and all green pixels of the active pixel sensor array are processed by the second plurality of analog-to-digital converter blocks.

55. The image sensor of claim 53, wherein the first plurality of analog-to-digital converter blocks and the second plurality of analog-to-digital converter blocks are disposed at opposite sides of the active pixel sensor array.

56. The image sensor of claim 53, wherein the first plurality of analog-to-digital converter blocks and the second plurality of analog-to-digital converter blocks are disposed at opposite sides of the active pixel sensor array.

57. A method of reducing fixed pattern noise, comprising:
selecting a row line of an active pixel sensor array including plurality of unit pixels;
connecting all even column lines of the active pixel sensor array to a first plurality of analog-to-digital converter blocks;
connecting all odd column lines of the active pixel sensor array to a second plurality of analog-to-digital converter blocks, each of the first and second analog-to-digital converter blocks including
a correlated double sampling block for holding an image sample;
an amplifier for amplifying the image sample;
an analog-to-digital converter for converting input analog sample to a digital signal, and
a latch block for latching digital signals from the analog-to-digital converter; wherein
at least one of all even column lines or all odd column lines are processed simultaneously; and
outputting a signal from the latch block by multiplexing.

58. The method of claim 57, wherein connecting all even column lines of the active pixel sensor array to a first plurality of analog-to-digital converter blocks is established when the row line is even, and connecting all odd column lines of the active pixel sensor array to a second plurality of analog-to-digital converter blocks is established when the row line is odd.

* * * * *